F. H. BRAND.
COMBINED ARMY SUPPLY TRUCK AND AMBULANCE.
APPLICATION FILED NOV. 1, 1917.

1,287,855.

Patented Dec. 17, 1918.
3 SHEETS—SHEET 1.

INVENTOR
Frank Hugo Brand

F. H. BRAND.
COMBINED ARMY SUPPLY TRUCK AND AMBULANCE.
APPLICATION FILED NOV. 1, 1917.

1,287,855.

Patented Dec. 17, 1918.
3 SHEETS—SHEET 3.

INVENTOR
Frank Hugo Brand

UNITED STATES PATENT OFFICE.

FRANK HUGO BRAND, OF ELMWOOD PLACE, OHIO.

COMBINED ARMY SUPPLY-TRUCK AND AMBULANCE.

1,287,855.

Specification of Letters Patent.  Patented Dec. 17, 1918.

Application filed November 1, 1917.  Serial No. 199,685.

*To all whom it may concern:*

Be it known that I, FRANK HUGO BRAND, a citizen of the United States, residing in Elmwood Pl., in the county of Hamilton and State of Ohio, have invented new and useful Improvements in Combined Army Supply-Trucks and Ambulances, of which the following is a specification.

An object of my invention is a vehicle adapted to be used either as a supply truck or as an ambulance partaking somewhat of the nature of a portable field hospital.

In the drawings Figure 1 illustrates a vehicle embodying my invention, adapted for use as a trailer for attachment to an automobile truck, the elements of the construction being arranged for use in hauling troops.

A vehicle embodying my invention preferably consists of a frame having two seats 7, 7 located on each side of a centrally located aisle 8, swinging seat backs 9, 9 being provided so that soldiers occupying the seats may sit either facing each other or with their backs to one another, in which latter mentioned position the running boards 10, 10 may be utilized for their feet with other soldiers standing in the aisle, or in the first mentioned position the running boards will be left free so that soldiers may stand thereon and hold on to the backs of the seats.

Figure 1:
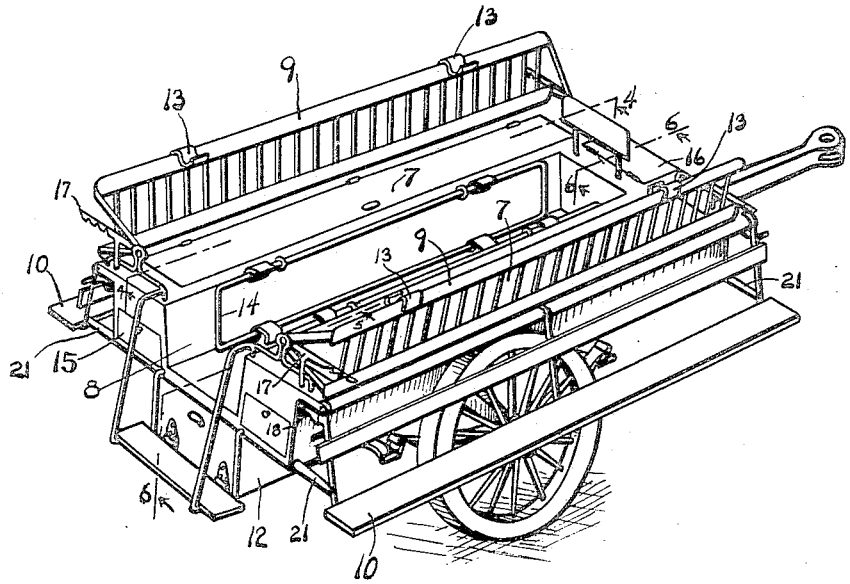
Figure 2:
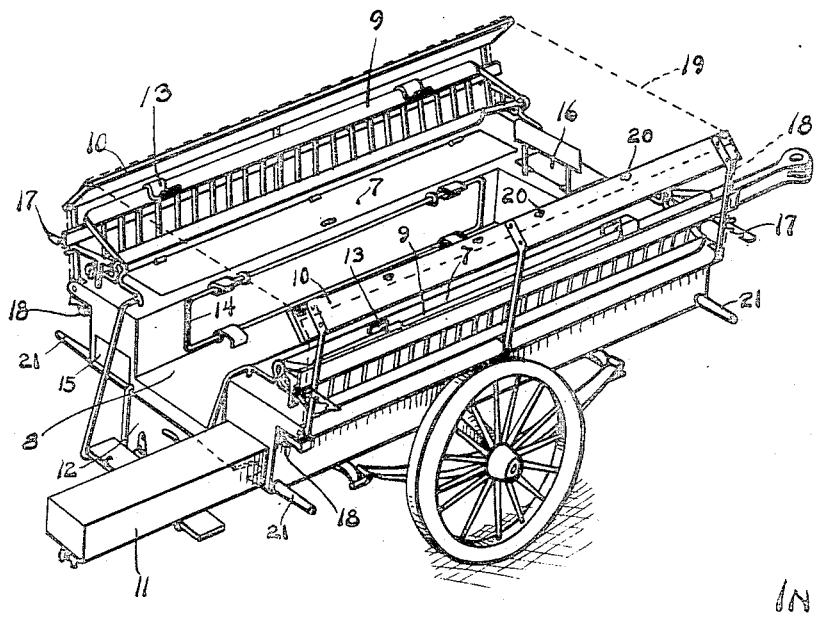
Fig. 2 is a view similar to Fig. 1, but showing the elements arranged for use in hauling hay or straw, other details being shown in full and in dotted lines for purposes to be hereinafter more fully explained.
Figure 3:
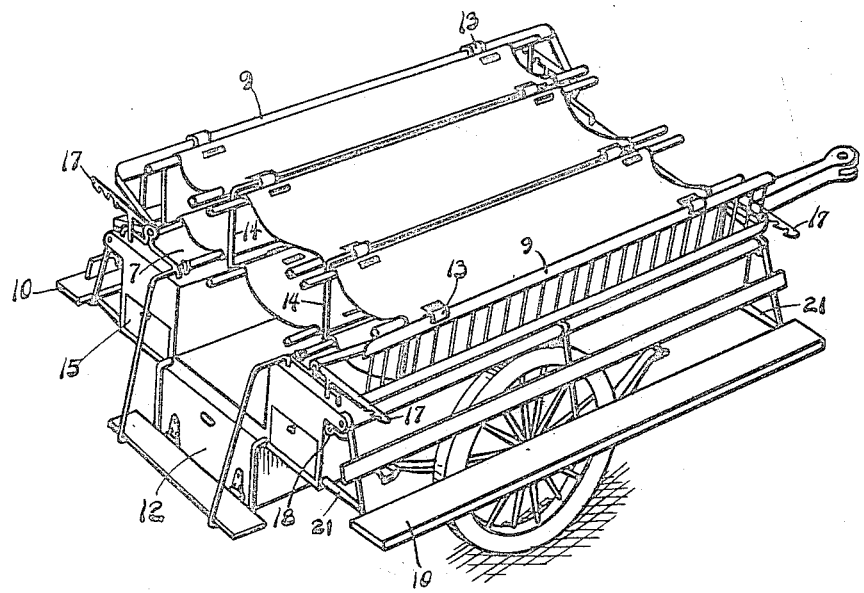
Fig. 3 is a view similar to Figs. 1 and 2, but showing my invention adapted for use as an ambulance.
Figure 4:
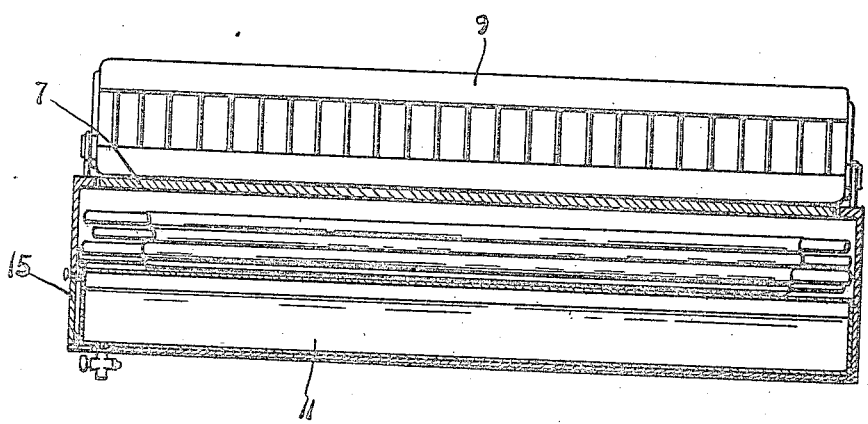
Fig. 4 is a longitudinal sectional view taken on the line 4—4 of Fig. 1.
Figure 5:
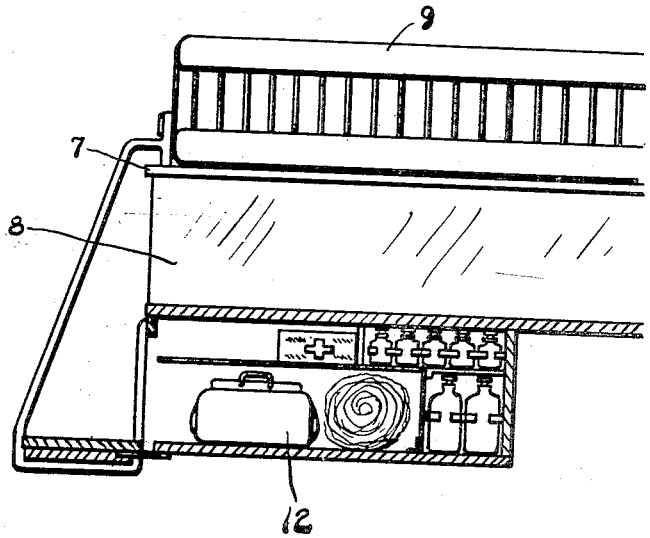
Fig. 5 is a fragmental sectional view taken on the line 6—6 of Fig. 1.

A supply truck going to the front with men as above described, is also equipped to act as an ambulance on the return trip, tanks 11, 11, see Figs. 4 and 2, being provided beneath the seats, for carrying fresh water, with room above the tanks for the storage of stretchers as shown in Fig. 4. Within a compartment 12, see Fig. 5, medical and surgical supplies may be carried. In carrying the stretchers with wounded thereon, I have provided hooks 13 on the backs of the seats with coöperating hooks on frames 14 which are pivotally mounted to lie against the inner side of the seats normally, or to be thrown up to the positions disclosed in Fig. 3 when carrying stretchers. In addition to the stretchers between the frames and seat-backs, an additional stretcher may be carried between the frames, other stretchers being carried on a level with the seats, should it be necessary, by supporting one between the seats and by throwing back the seat covers and supporting others over the openings in the seats. Any suitable means, such as the hooks 13 may be employed for holding this lower series of stretchers in position.

Figure 6:
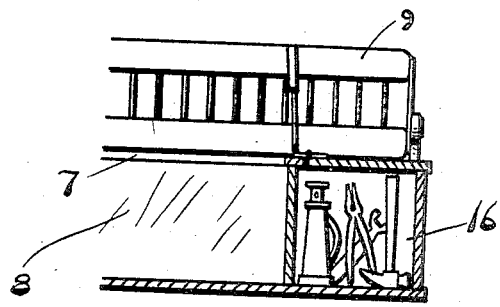
Fig. 6 is a fragmental sectional view taken on the line 6—6 of Fig. 1.

A feature of my invention is that the water tanks may be easily removed as disclosed in Fig. 2, by removing covers 15 at the ends of the seats. This enables the tanks to be easily cleaned, repaired or refilled. Another feature lies in the provision of a tool compartment 16 at the front of the truck, see Fig. 6.

A valuable feature of the truck when used as an ambulance, is that running boards 10, 10 may be thrown up and hooked by means of latches 17 pivotally mounted at the ends of the seats, to hold them in the positions shown in Fig. 2. In this position, a covering provided by cloth from rollers 18 beneath the seats and a separate sheet 19 over the top, both of which are shown in dotted lines in Fig. 2, and which are secured by fasteners 20, is provided. This feature when the truck is not in use as an ambulance, in valuable in that the truck is readily converted into a hay wagon by means of which hay or straw may be carried.

In order that the weight of men standing on the running boards, will not break them down, I have provided studs 21 which abut the running boards when in their dropped positions. These studs are also useful in hanging articles, such as buckets therefrom.

Having thus described my invention what I claim is:—

A combined supply truck and ambulance comprising a vehicle bed having a seat on each side thereof and an aisle located between the seats, reversible backs for the seats, running boards pivotally mounted on the bed adjacent to the backs of the seats, means for supporting the running boards in either elevated or lowered positions for either of the reversible positions of the seat backs, stretcher supports mounted on the seats and seat backs adapted to support stretchers thereon, and a covering adapted to be placed over the running boards when in their elevated positions, to protect the stretchers supported by said supports.

In witness whereof I affix my signature in the presence of two witnesses.

FRANK HUGO BRAND.

Witnesses:
RICHARD BRAND,
C. M. BECHTEL.